US 11,199,827 B2

(12) United States Patent
Ferraro et al.

(10) Patent No.: US 11,199,827 B2
(45) Date of Patent: Dec. 14, 2021

(54) CONTROLLER WITH PROGRAMMABLE HAND-OFF-AUTO (HOA) SWITCHES

(71) Applicant: Honeywell International Inc., Morris Plains, NJ (US)

(72) Inventors: Louis A. Ferraro, Forest Lake, MN (US); Suresh Vemuri, Bangalore (IN); Michael A. Pouchak, St. Anthony, MN (US); Paul C. Wacker, Plymouth, MN (US); Todd Kreft, Brooklyn Park, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 266 days.

(21) Appl. No.: 16/436,502

(22) Filed: Jun. 10, 2019

(65) Prior Publication Data
US 2020/0387130 A1 Dec. 10, 2020

(51) Int. Cl.
*G05B 19/10* (2006.01)
*F24F 11/64* (2018.01)
*F24F 11/88* (2018.01)

(52) U.S. Cl.
CPC ............ *G05B 19/106* (2013.01); *F24F 11/64* (2018.01); *F24F 11/88* (2018.01); *G05B 2219/2614* (2013.01)

(58) Field of Classification Search
CPC .......... G05B 19/106; F24F 11/64; F24F 11/88
USPC ....................................................... 700/276
See application file for complete search history.

(56) References Cited

U.S. PATENT DOCUMENTS

| 4,153,945 A | | 5/1979 | Actor et al. |
| 4,401,412 A | * | 8/1983 | Salina ................. F04D 15/0209 417/12 |
| 4,521,843 A | | 6/1985 | Pezzelo et al. |
| 5,422,550 A | * | 6/1995 | McClanahan ............ H02P 5/50 318/103 |

(Continued)

FOREIGN PATENT DOCUMENTS

| EP | 0347703 A1 | 12/1989 |
| JP | 2012523721 A | 10/2012 |

OTHER PUBLICATIONS

"CIPer Model 10 Controller (/CIPer-Controllers/CIPer%E2%84%A2-Model-10-Controller)," Honeywell, 3 pages, 2019.

(Continued)

*Primary Examiner* — Robert A Cassity
(74) *Attorney, Agent, or Firm* — Seager, Tufte & Wickhem, LLP (57) ABSTRACT

A building controller includes a plurality of inputs, a plurality of outputs and a plurality of manually-actuated HAND-OFF-AUTO (HOA) switches each having a HAND (H) position, an OFF (O) position and an AUTO (A) position, wherein each of the plurality of HOA switches is associated with but not directly coupled to a corresponding output of the plurality of outputs. A controller is operatively coupled to the plurality of inputs, the plurality of outputs, and the plurality of HOA switches and is configured to recognize a position of each of the plurality of HOA switches, and to control one or more of the plurality of outputs in accordance with the recognized position of each of the plurality of HOA switches as well as a plurality of programmed configuration settings associated with the plurality of HOA switches.

20 Claims, 7 Drawing Sheets

(56) References Cited

U.S. PATENT DOCUMENTS

| | | | |
|---|---|---|---|
| 6,227,961 B1* | 5/2001 | Moore | F24F 11/77 |
| | | | 454/229 |
| 6,609,070 B1* | 8/2003 | Lueck | B01D 61/12 |
| | | | 210/614 |
| 7,957,839 B2 | 6/2011 | Takach et al. | |
| 8,418,128 B2 | 4/2013 | Pouchak et al. | |
| 8,532,797 B2 | 9/2013 | Gutha et al. | |
| 8,549,422 B2 | 10/2013 | Gutha et al. | |
| 8,640,120 B2 | 1/2014 | Gutha et al. | |
| 8,650,306 B2 | 2/2014 | Pouchak | |
| 8,738,793 B2 | 5/2014 | Gutha et al. | |
| 8,793,668 B2 | 7/2014 | Gutha et al. | |
| 10,240,593 B2 | 3/2019 | Stephens | |
| 2002/0152298 A1 | 10/2002 | Kikta et al. | |
| 2003/0107495 A1* | 6/2003 | Swieboda | G01D 11/30 |
| | | | 340/693.5 |
| 2004/0168094 A1* | 8/2004 | Chen | G06F 1/1632 |
| | | | 713/300 |
| 2008/0222432 A1* | 9/2008 | Gilbert | H01R 13/6675 |
| | | | 713/300 |
| 2009/0113037 A1 | 4/2009 | Pouchak | |
| 2009/0271001 A1* | 10/2009 | Westphal | G05B 15/02 |
| | | | 700/3 |
| 2010/0138054 A1 | 6/2010 | Goupil | |
| 2011/0160878 A1 | 6/2011 | Gutha et al. | |
| 2011/0160879 A1 | 6/2011 | Gutha et al. | |
| 2013/0241456 A1 | 9/2013 | Perra et al. | |
| 2014/0368956 A1 | 12/2014 | Perra et al. | |
| 2018/0199439 A1* | 7/2018 | Kreuter | G05B 15/02 |
| 2019/0245706 A1* | 8/2019 | Jones | H04L 12/10 |

OTHER PUBLICATIONS

"CIPer Model 30 HVAC Controller: Scalable, Fast and Flexible" Honeywell, 2 pages, May 2019.

"CIPer Controllers With Niagara 4 Framework," Honeywell, 3 pages, Apr. 2019.

"DVC-V304," Delta Controls, 3 pages, 2019.

"Technical Document: Niagara AX-3.X Browser Access Guide," Niagra Framework, 84 pages, May 30, 2007.

"Spyder: PUL-, PVL-, PUB-, PVB- Controllers," Honeywell, 422 pages, Mar. 2015.

EP20179389, European Search Report, pp. 8, dated Oct. 23, 2020.

Alexander, "Clear Up Your HOA Confusion," Efficient Plant, 7 pages, 2016.

"H-O-A Operation," CORSAIR, 3 pages, Mar. 12, 2006.

John, "Hand off Auto Switch Operation," Electrical Engineering Instrumentation, 3 pages, Jun. 2018.

"MR-600 Series: Manual Override Relays," Air Products and Controls, 2 pages, 2005.

"Fire Pump Controllers," Jockey Pump Controllers, 53 pages, Jun. 2015.

* cited by examiner

CONTROLLER WITH PROGRAMMABLE HAND-OFF-AUTO (HOA) SWITCHES

TECHNICAL FIELD

The present disclosure pertains generally to building control systems and more particularly to building controllers that accommodate and/or facilitate control of a building's environment.

BACKGROUND

Building control systems are often used to help control a building's environment, such as temperature, humidity, air quality, lighting, security and/or other aspects of a building's environment. An example building control system may include a Heating, Ventilation, and/or Air Conditioning (HVAC) system used to control the comfort level within a building. Such HVAC systems typically include an HVAC controller that controls various HVAC components of the HVAC system in order to affect and/or control one or more environmental conditions within the building. A need remains for improved building controllers.

SUMMARY

This disclosure relates generally to building controllers such as HVAC controllers. An example of the disclosure includes a Heating, Ventilating and Air Conditioning (HVAC) controller for controlling operation of at least part of an HVAC system. The illustrative HVAC controller includes a housing, a plurality of inputs that are carried by the housing and are accessible from outside of the housing and a plurality of outputs that are carried by the housing and are accessible from outside of the housing. The illustrative HVAC controller may also include a plurality of manually-actuated HAND-OFF-AUTO (HOA) switches that are carried by the housing with each HOA switch having a HAND (H) position, an OFF (O) position and an AUTO (A) position. Also, each of the plurality of HOA switches may be associated with a corresponding one of the plurality of outputs. A memory may be housed by the housing, and a controller also housed by the housing may be operably coupled to the memory, the plurality of inputs, the plurality of outputs, and the plurality of HOA switches. The controller may be configured to receive signals from the plurality of inputs and to recognize a position of each of the plurality of HOA switches. The controller may provide control signals to the plurality of outputs, wherein the control signal provided to a first one of the plurality of outputs is based at least in part on the recognized position of the HOA switch that corresponds to the first one of the plurality of outputs in conjunction with a configuration setting stored in the memory that is also associated with the HOA switch that corresponds to the first one of the plurality of outputs.

Another example of the disclosure includes a building controller for controlling operation of one or more building components in a building system. The building controller may include a plurality of inputs, a plurality of outputs and a plurality of manually-actuated HAND-OFF-AUTO (HOA) switches each having a HAND (H) position, an OFF (O) position and an AUTO (A) position, wherein each of the plurality of HOA switches is associated with but not directly coupled to a corresponding output of the plurality of outputs. A controller may be operatively coupled to the plurality of inputs, the plurality of outputs, and the plurality of HOA switches. The controller may be configured to recognize a position of each of the plurality of HOA switches, and to control one or more of the plurality of outputs in accordance with the recognized position of each of the plurality of HOA switches as well as a plurality of programmed configuration settings associated with the plurality of HOA switches.

Another example of the disclosure may be found in a building controller that includes a plurality of inputs, a plurality of outputs and a plurality of manually-actuated HAND OFF AUTO (HOA) switches each having a HAND (H) position, an OFF (O) position and an AUTO (A) position. Each of the plurality of HOA switches is associated with but not directly coupled with a corresponding output of the plurality of outputs. The building controller may include a plurality of indicator lights, each of the plurality of indicator lights associated with one of the plurality of HOA switches and a corresponding one of the plurality of outputs. A controller may be operably coupled to the plurality of inputs, the plurality of outputs, and the plurality of HOA switches. The controller may execute a programmable function block engine that defines at least some functions of the controller, wherein the programmable function block engine is configured to references the position of one or more of the plurality of HOA switches when defining a function of one or more of the outputs.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
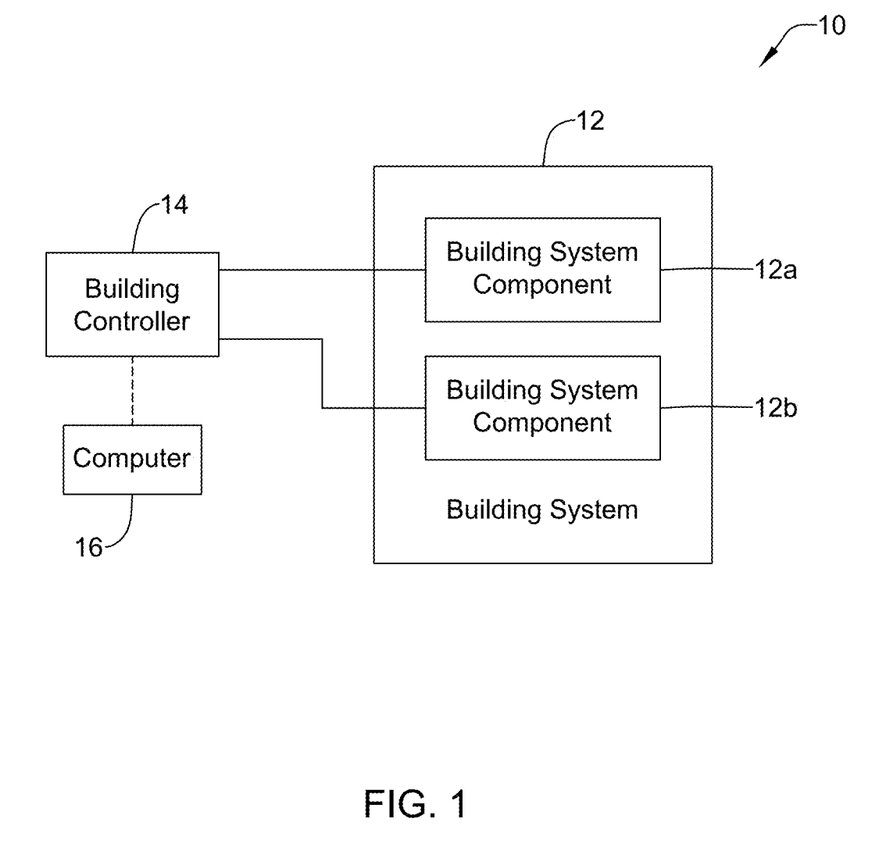
FIG. 1 is a schematic block diagram of an illustrative building control system.

FIG. 1 is a schematic block diagram of an illustrative building control system 10. The building control system 10 includes a building system 12 and a building controller 14 that is configured to control operation of at least part of the building system 12. The building system 12 is shown as including a building system component 12a and a building system component 12b. It will be appreciated that this is merely illustrative, as the building system 12 may have any number of distinct building system components, and likely has a large number of distinct building system components. The building system 12 may represent any number of different building systems, such as but not limited to an HVAC system, a lighting system, a security system and the like. For purposes of illustration, the building system 12 will be described herein with respect to an HVAC system, but the disclosure is not intended to be so limiting.

In some cases, the building control system 10 may include a computer 16. The computer 16 may be a desktop computer, a laptop computer, a tablet computer, or any other suitable computing device. The computer 16 may be disposed adjacent the building controller 14 for purposes of programming the building controller 14. In some instances, the computer 16 may be remotely located, or may represent a cloud-based server that is capable of communicating with the building controller 14. In some cases, the computer 16 may implement a programming desktop such as a function block wire sheet, in which function blocks may be dragged and dropped onto a wire screen, and the user may subsequently easily connect various inputs and outputs of the function blocks to program desired functions of the building controller 14. The software may translate the function blocks and related inputs and outputs for use by the building controller 14 in controlling operation of the building system 12. In some cases, the building controller 14 may execute a function block engine (e.g., see FIG. 2) that is capable of executing code translated from the function block engine wire sheet.

Figure 2:
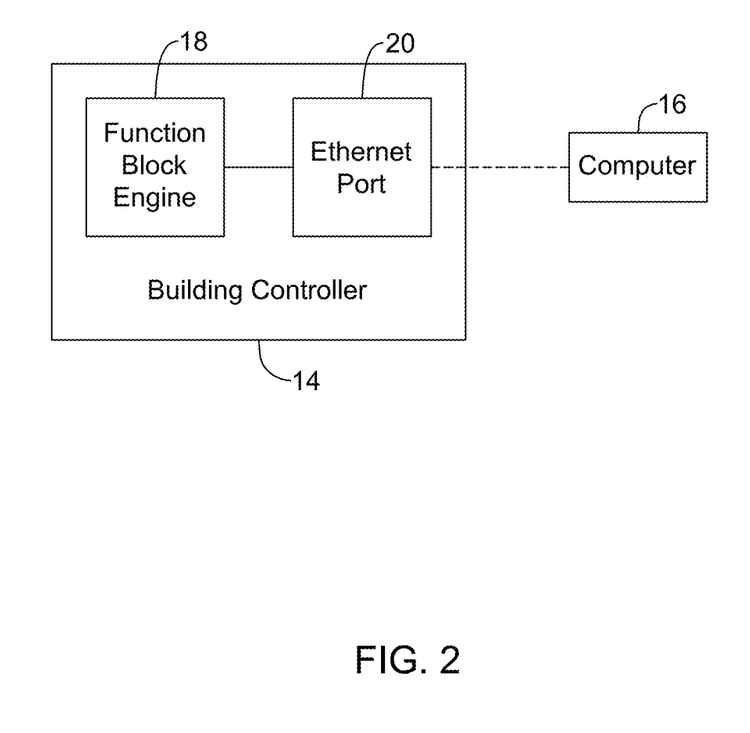
FIG. 2 is a schematic block diagram of an illustrative building controller usable with the illustrative building system of FIG. 1.

FIG. 2 is a schematic block diagram of the illustrative building controller 14. In some cases, as illustrated, the building controller 14 may include a function block engine 18 that is configured to utilize the function blocks and wire screen referenced in FIG. 1 to control operation of the building controller 14. A variety of function block and wire screen systems are known. In some cases, the building controller 14 (and the computer 16) may utilize the function block and wire screen system available commercially under the NIAGARA™ name. in some cases, the building controller 14 may include an ETHERNET™ port 20 by which the computer 16 may communicate with the building controller 14. The ETHERNET™ port 20 may be a single port, or it may represent a multi-port switch such as a 4-port gigahertz switch. In some instances, the building controller 14 may be configured to communicate wirelessly with the computer 16.

Figure 3:
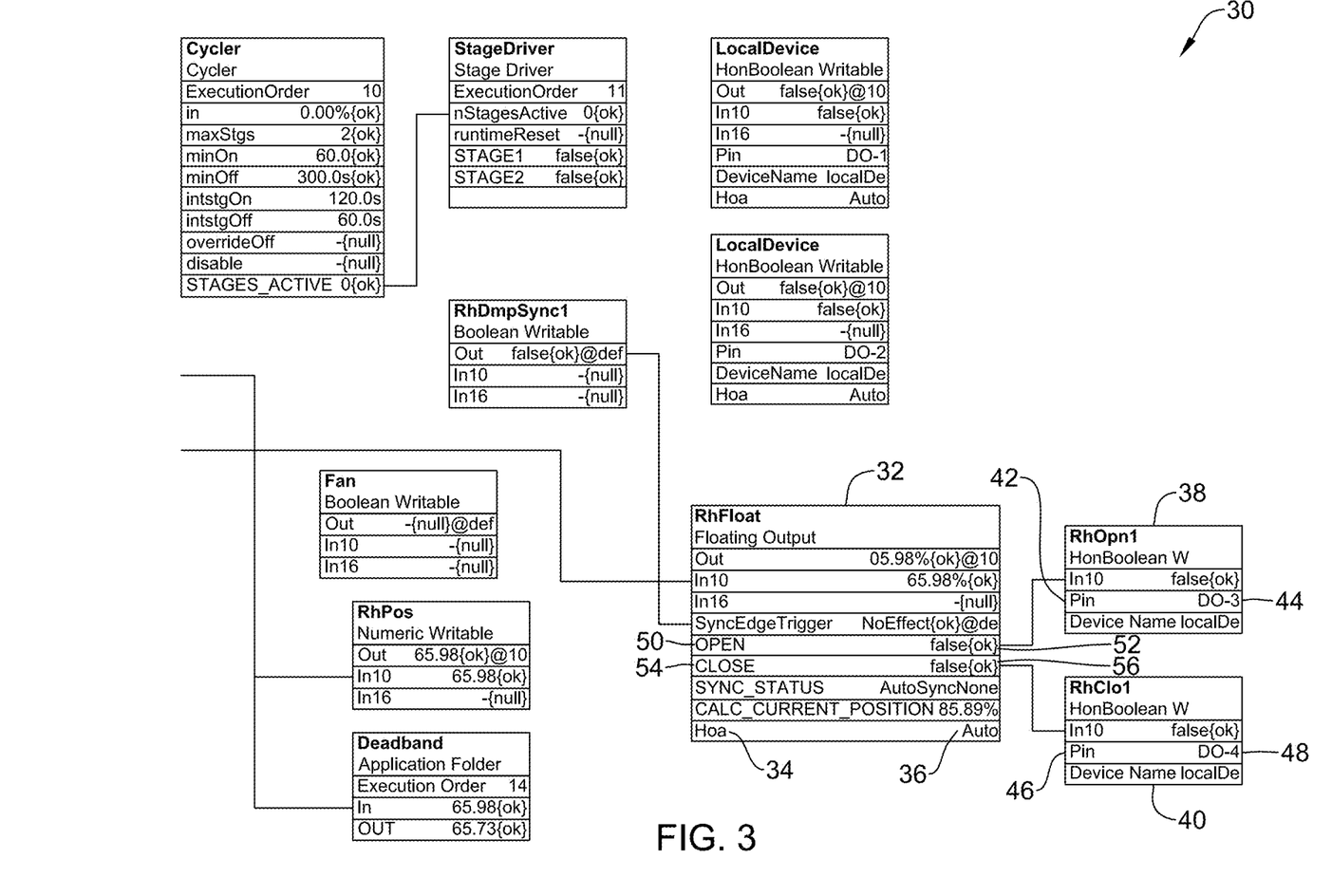
FIG. 3 is a screen capture of a portion of an illustrative function block wire sheet usable in programming the illustrative building controller of FIG. 2.

FIG. 3 is a screen capture of a portion of an illustrative but non-limiting wire screen 30. It will be appreciated that an actual wire screen 30 may be much larger, and include a large number of function blocks and accompanying links between the various inputs and outputs of each of the function blocks. To call out a particular example, it can be seen that the wire screen 30 includes an RHFLOAT floating output function block 32. As can be seen, the RHFLOAT floating output function block 32 displays various parameter values. In some cases, which parameter values are used and/or displayed may be user-programmed. In the example show, one of the displayed parameter values is an HOA parameter 34 and its accompanying value 36. The HOA parameter 34 represents a particular HOA (HAND-OFF-AUTO) switch that is associated with the RHFLOAT floating output function block 32. A HOA switch is a mechanically actuated switch that is actuatable between a HAND (H) setting which represents a manual "ON" setting, an OFF (O) setting which shuts off a particular output associated with that particular HOA switch, and an AUTO (A) setting which places the particular output in automatic control (e.g., to be controlled by a control algorithm of the building controller 14).

The RHFLOAT floating output function block 32 is associated with a floating motor. A floating motor is a motor that can be driven in a first direction (say, to open a damper) by applying voltage pulses to a first electrical contact, and can be driven in a second direction (say, to close the damper) by applying voltage pulses to a second electrical contact. The floating motor would of course also have a ground contact. The RHFLOAT floating output function block 32 can be seen as being operably coupled to an RHOPN1 function block 38 that controls whether an output DO-3 of the building controller 14 is energized and a RHCL01 function block 40 that controls whether an output DO-4 is energized. This can be seen by a PIN parameter 42 and associated value 44 as shown in the RHOPN1 function block 38 and a PIN parameter 46 and associated value 48 as shown in the RHOPN1 function block 38. For purposes of illustration, say that the output DO-3, when energized, drives the floating motor in a first direction while the output DO-4, when energized, drives the floating motor in an opposing second direction. Neither are currently energized, as indicated in the RHFLOAT floating output function block 32 as seen by the OPEN parameter 50 and associated FALSE value 52 and the CLOSED parameter 54 and associated FALSE value 56.

Figure 4:
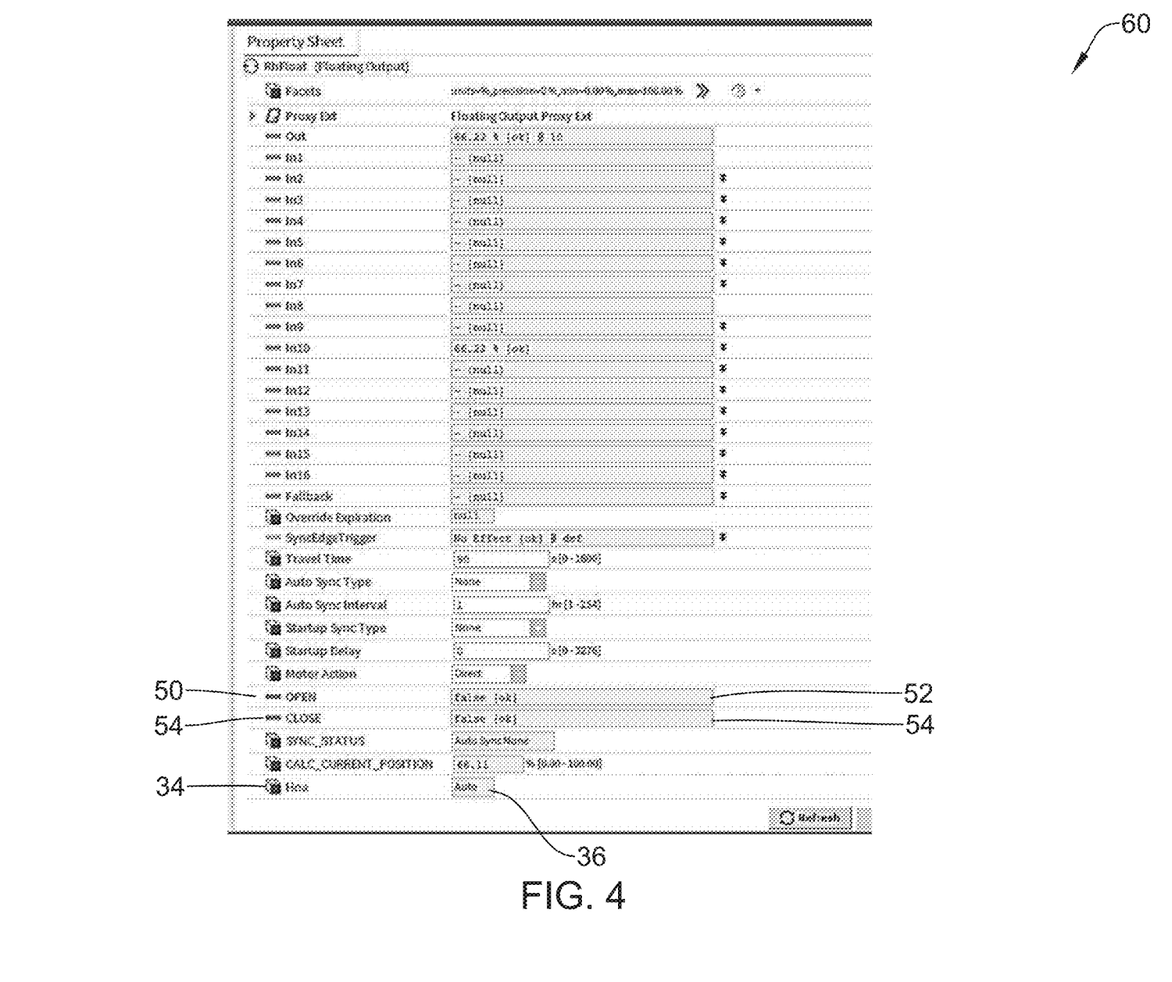
FIG. 4 is a screen capture of a property sheet pertaining to one of the function blocks shown in the illustrative function block wire sheet of FIG. 3.

FIG. 4 is a screen capture of an illustrative property sheet 60 that corresponds to the RHFLOAT floating output function block 32 (FIG. 3). It can be seen that while the property sheet 60 includes all of the parameters displayed by the RHFLOAT floating output function block 32, such as but not limited to the HOA parameter 34 and associated AUTO value 36, the OPEN parameter 50 and associated FALSE value 52 and the CLOSED parameter 54 and associated FALSE value 56, the property sheet 60 also includes a number of additional parameters. This allows a user to access parameters and associated parameter values that may be of lesser interest, and thus are not displayed on the RHFLOAT floating output function block 32.

It will be appreciated that FIGS. 3 and 4 provide just a small snippet into an actual wire sheet that includes a larger number of function blocks and corresponding connections between the inputs and outputs of each of the function blocks. This is intended to just provide a small example of how the function block wire sheet functions, and how a user might create the wire screen 30 using the computer 16. As will be appreciated, the use of function blocks to program the building controller 14 can provide a powerful, easy to understand way to program the building controller 14 without having to write lower level code, for example. Rather, the user need only define and interconnect the function blocks, and these function block wire sheets can be translated into code that can be executed by the function block engine 18 of the building controller 14.

Figure 5:
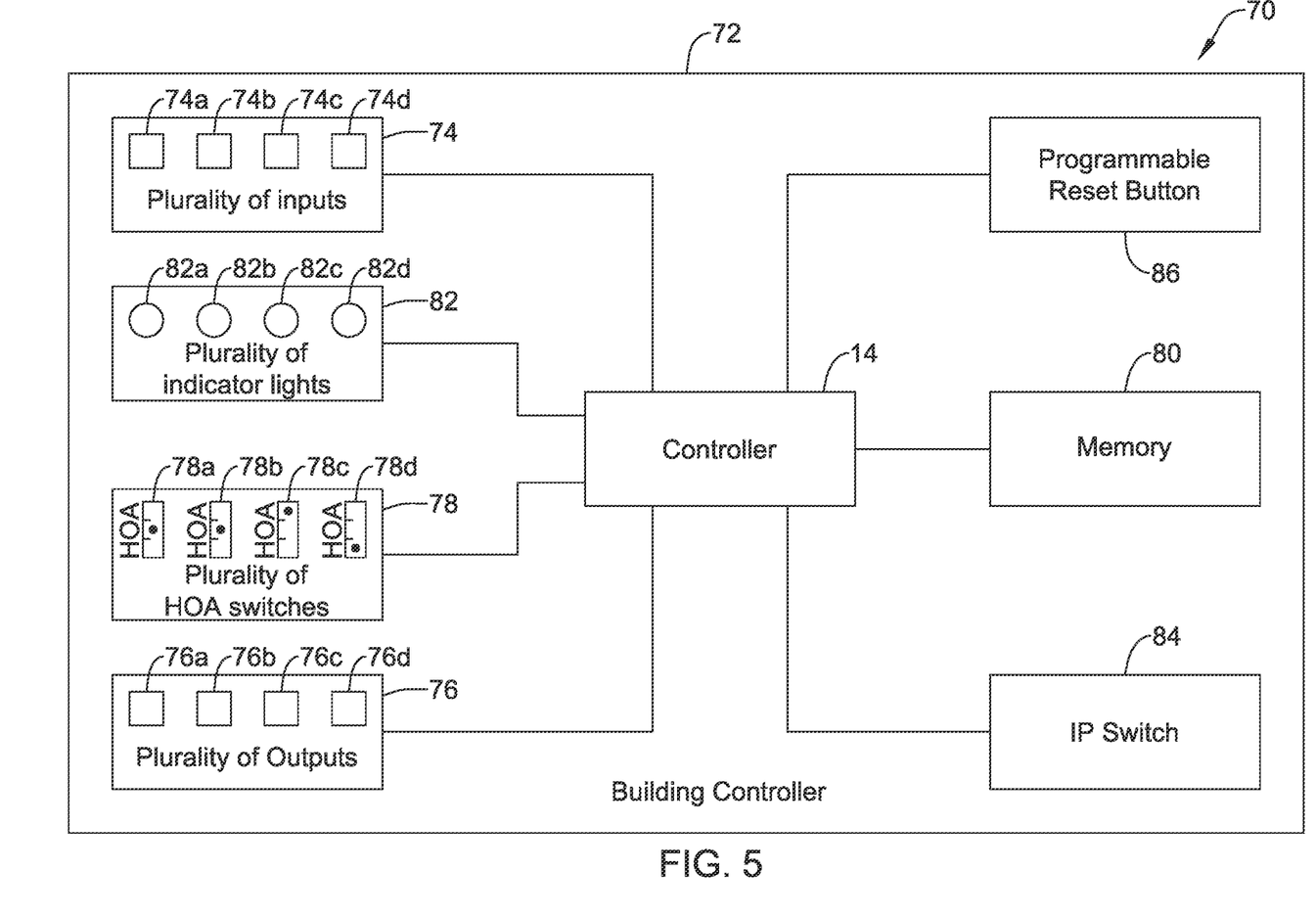
FIG. 5 is a schematic block diagram of an illustrative building controller usable with the illustrative building system of FIG. 1.

FIG. 5 is a schematic block diagram of an illustrative building controller 70 for controlling operation of one or more building components in the building system 12. In some cases, the building system 12 may be an HVAC system, and the building controller 70 may thus be an HVAC controller. The illustrative building controller 70 includes a housing 72. A plurality of inputs 74 are disposed within the housing 72 and are accessible from an outside of the housing 72. While a total of four inputs 74a, 74b, 74c, 74d are shown, it will be appreciated that this is merely illustrative, as the building controller 70 may have any number of inputs 74, and in some cases will have more than four inputs 74. The illustrative building controller 70 also includes a plurality of outputs 76 that are disposed within the housing 72 and are accessible from an outside of the housing 72. While a total of four outputs 76a, 76b, 76c, 76d are shown, it will be appreciated that this is merely illustrative, as the building controller 70 may have any number of outputs 76, and in some cases will have more than four outputs 76. The inputs 74 may be used for receiving sensor inputs, for example, while the outputs 76 may be selectively energized in order to control individual components of the building system 12.

The illustrative building controller 70 includes a plurality of manually-actuated HAND-OFF-AUTO (HOA) switches 78, each of which have a HAND (H) position, an OFF (O) position and an AUTO (A) position. In the example shown, each HOA switch of the plurality of HOA switches 78 is associated with but not directly coupled to a corresponding output of the plurality of outputs 76. In some instances, the building controller 14 may execute a programmable function block engine that defines at least some of the functions of the building controller 14. The programmable function engine block, such as that referenced with respect to the function block engine 18 (FIG. 2) and the wire screen 30 (FIG. 3), may be configured to reference the position of one or more of the plurality of HOA switches 78 when defining a function of one or more of the outputs 76.

As an illustrative but non-limiting example, the function of a first one of the plurality of outputs may include providing a control signal to a first one of the plurality of outputs 76 based at least in part on one or more signals received on one or more of the plurality of inputs 74 when the HOA switch 78 that corresponds to the first one of the plurality of outputs is in the AUTO (A) position. The function of the first one of the plurality of outputs 76 may also include providing a control signal to the first one of the plurality of outputs 76 that is not based on one or more signals received on one or more of the plurality of inputs 74 when the HOA switch 78 that corresponds to the first one of the plurality of outputs is in the HAND (H) position and/or OFF (O) position. For example, the function may assert the first one of the plurality of outputs 76 when the HOA switch 78 that corresponds to the first one of the plurality of outputs is in the HAND (H) position, and may ground the first one of the plurality of outputs 76 when the HOA switch 78 that corresponds to the first one of the plurality of outputs is in the OFF (O) position.

The illustrative building controller 70 includes the building controller 14, which is operatively coupled to the plurality of inputs 74, the plurality of outputs 76, and the plurality of HOA switches 78. In some cases, the building controller 14 may be configured to recognize a position of each of the plurality of HOA switches 78, and to control one or more of the plurality of outputs 76 in accordance with the recognized position of each of the plurality of HOA switches 78 as well as a plurality of programmed configuration settings associated with the plurality of HOA switches 78. The illustrative building controller 70 includes a memory 80 that is coupled with the building controller 14. The memory 80 may be used, for example, to store the programmed configuration settings that are associated with the plurality of HOA switches 78. In some cases, the building controller 14 may be further configured to enable a predetermined delay before changing one of the plurality of outputs 76 in response to a user manually changing a position of a corresponding HOA switch of the plurality of HOA switches 78 between the OFF, HAND and/or AUTO positions.

In some cases, the building controller 14 may be configured to provide control signals to the plurality of outputs 76, wherein the control signal provided to a first one of the plurality of outputs 76 is based at least in part on the recognized position of the HOA switch 78 that corresponds to the first one of the plurality of outputs 76 in conjunction with a configuration setting stored in the memory 80 that is also associated with the HOA switch 78 that corresponds to the first one of the plurality of outputs 76. In some cases, the configuration setting may be programmable, either within the function block wire sheet programming, or subsequently by a user. The control signal provided to the first one of the plurality of outputs 76 may, for example, be based at least in part on one or more of the received signals from the plurality of inputs 74 when the HOA switch 78 that corresponds to the first one of the plurality of outputs 76 is in the AUTO (A) position. In some cases, the control signal provided to the first one of the plurality of outputs 76 is not based on one or more of the received signals from the plurality of inputs 74 when the HOA switch 78 that corresponds to the first one of the plurality of outputs 76 is in the HAND (H) position. In some cases, the first one of the plurality of outputs 76 may be asserted when the corresponding HOA switch 78 is in the HAND (H) position. In some cases, the control signal provided to the first one of the plurality of outputs 76 is not based on one or more of the received signals from the plurality of inputs 74 when the HOA switch 78 that corresponds to the first one of the plurality of outputs 76 is in the OFF (O) position. In some cases, the first one of the plurality of outputs 76 may be de-asserted when the corresponding HOA switch 78 is in the OFF (O) position.

Other configuration settings may be programmed. For example, in some cases, the configuration setting associated with the HOA switch 78 that corresponds to the first one of the plurality of outputs 76 may define a delay period, wherein the control signal provided to the first one of the plurality of outputs 76 is based on at least in part on the recognized position of the HOA switch 78 that corresponds to the first one of the plurality of outputs 76 only after the recognized position of the HOA switch 78 that corresponds to the first one of the plurality of outputs 76 remains in the same recognized position for at least the delay period (e.g. 1 second).

In some cases, such as when two HOA switches 78 in combination are used in conjunction with two outputs 76 that are operably coupled with a device such as a floating motor (as discussed with respect to FIG. 3), the configuration setting stored in the memory 80 may be associated with both the HOA switch 78 that corresponds to the first one of the plurality of outputs 76 and the HOA switch 78 that corresponds to a second one of the plurality of outputs 76. Then, the control signal provided to the first one of the plurality of outputs 76 may be based at least in part on the recognized position of the HOA switch 78 that corresponds to the first one of the plurality of outputs 76, the recognized position of the HOA switch 78 that corresponds to the second one of the plurality of outputs 76 and the configuration setting that is associated with the HOA switch 78 that corresponds to the first one of the plurality of outputs 76 and also associated with the HOA switch 78 that corresponds to a second one of the plurality of outputs 76.

In one example where this might be useful, the configuration setting may causes the building controller 14 to not control the first one of the plurality of outputs 76 in accordance with the HAND (H) position of the HOA switch 78 that corresponds to the first one of the plurality of outputs 76 when the HOA switch 78 that corresponds to the second one of the plurality of outputs 76 is already in the HAND (H) position. That is, the configuration setting may prevent both the first one of the plurality of outputs 76 and the second one of the plurality of outputs 76 to be concurrently turned on, regardless of the recognized positions of the HOA switch 78 that corresponds to the first one of the plurality of outputs 76 and the HOA switch 78 that corresponds to the second one of the plurality of outputs 76. In some cases, this may help prevent damage to a floating motor (or other circuitry) that is controlled by the first and second outputs.

In some instances, the building controller 70 may include a plurality of indicator lights 82. While a total of four indicator lights 82a, 82b, 82c, 82d are shown, it will be appreciated that this is merely illustrative, as the building controller 70 may have any number of indicator lights 82, and in some cases will have more than four indicator lights 82. In some cases, there may be a one-to-one correspondence between each of the indicator lights 82 and a corresponding HOA switch 78. In some cases, there may be a one-to-one correspondence between each of the indicator lights 82 and a corresponding one of the outputs 76. In some cases, there may be more inputs 74 and/or more outputs 76 than there are indicator lights 82.

In some instances, the building controller 14 may be configured to actuate one or more of the plurality of indicator lights 82 in response to whether the building controller 14 has energized the corresponding output of the plurality of outputs 76. As such, the indicator lights 82 may not switch with the corresponding HOA switch, but rather may reflect the state of the corresponding output. In some cases, the building controller 14 may, for example, be configured to communicate additional information by blinking one or more of the plurality of indicator lights 82 in one or more predetermined blinking patterns. At least some of plurality of indicator lights 82 may each be a light emitting diode (LED), although other light sources are also contemplated.

In some cases, the building controller 70 may include an Internet Protocol (IP) switch 84. The IP switch 84 may include a single ETHERNET™ port, for example, or may include a plurality of ETHERNET™ ports. The IP switch 84 may be operably coupled to the building controller 14, and may be used to, for example, upload a function block wire sheet (such as the wire screen 30) from the computer 16 (FIG. 2) to the function block engine 18 (FIG. 2). The IP switch 84 may also be used to connect additional functionality to the building controller 70, and/or to provide a separate building network that is separate from the IT network of the business. For example, one or more security cameras (not illustrated) may be connected to the IP switch 84. This is just an example.

The building controller 70 may, for example, include a programmable reset button 86 that is carried by the housing 72 and is accessible from outside of the housing 72. The memory 80 may store programmable instructions that define one or more programmable actions to be carried out in response to activation of the programmable reset button 86 by a user. In response to the user actuating the programmable reset button 86 (e.g. by touching or pushing the button), the building controller 14 may be configured to implement one or more programmable actions defined for the programmable reset button 86. In some instances, the programmable instructions may be received from a programming environment (such as the computer 16) via the IP switch 84.

The building controller 14 may take a variety of actions in response to the user actuating the programmable reset button 86, depending on the programmable instructions. For example, the building controller 14 may implement a restart of only a portion of the building controller 70 (e.g. one card of the building controller). The building controller 14 may implement a full restart of the building controller 70. The building controller 14 may simply shut down the building controller 70. The programmable actions carried out in response to activation of the programmable reset button 86 may include providing one or more control signals to the plurality of outputs. The one or more programmable actions to be carried out in response to activation of the programmable reset button 86 may include providing control signals that execute a test on one or more HVAC components. For example, the test may include a test and balancing procedure for a Variable Air Volume (VAV) box.

As another example, the one or more programmable actions to be carried out in response to activation of the programmable reset button 86 may include providing control signals that place at least part of an HVAC system into a remote control mode or an energy savings mode. The one or more programmable actions to be carried out in response to activation of the programmable reset button may include a first action and a second action, wherein the building controller 14 may be configured to implement the first action in response to a first actuation pattern of the programmable reset button by the user, and implement the second action in response to a second actuation pattern of the programmable reset button by the user. For example, the first actuation pattern and the second actuation pattern may differ in how long the programmable reset button 86 is held down and/or in how many times the programmable reset button 86 is actuated by the user. These are just examples.

Figure 6:
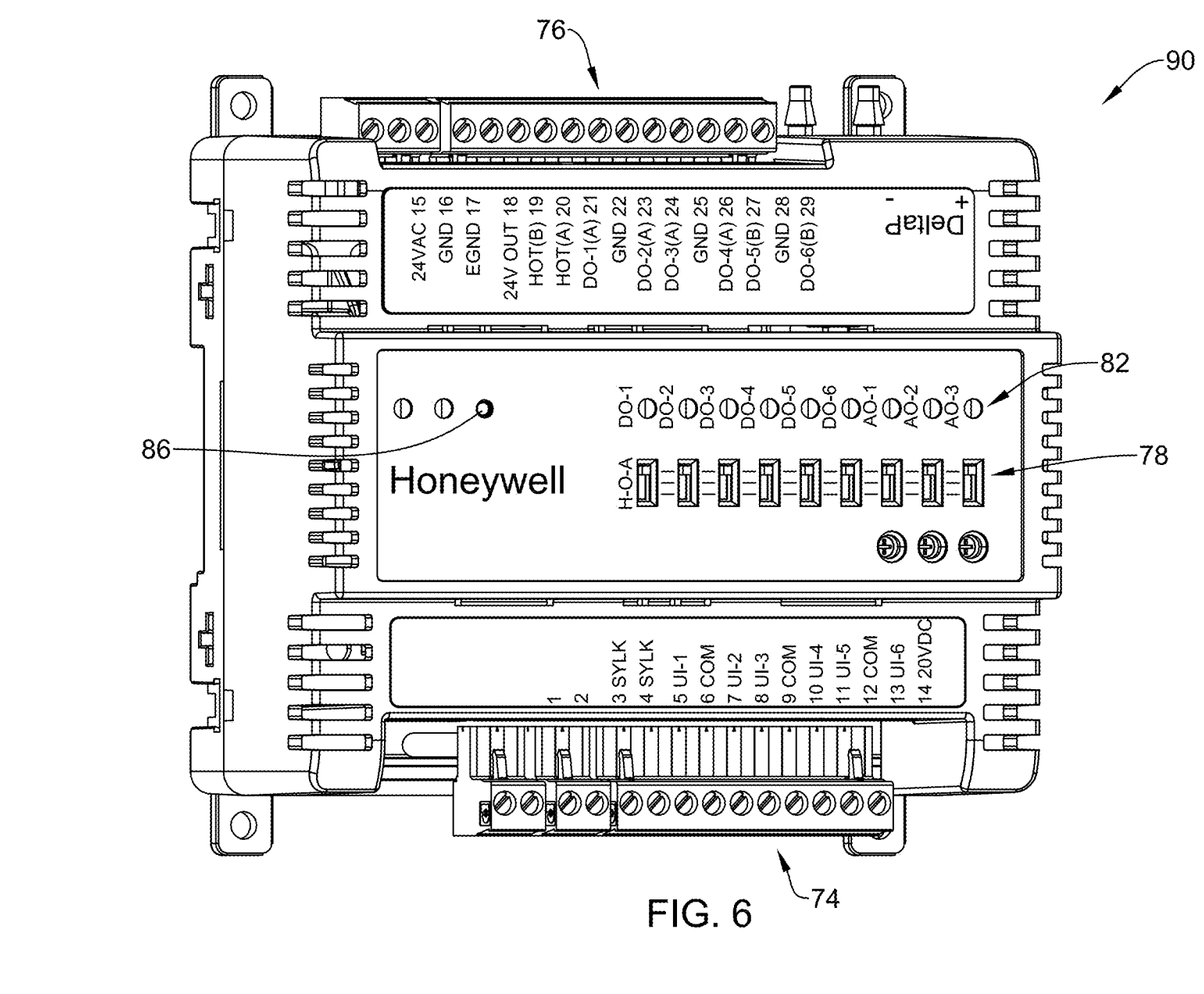
FIG. 6 is a perspective view of an illustrative HVAC controller.

FIG. 6 is a perspective view of an HVAC controller 90 that may be considered as being an example of the building controller 14 (FIG. 1) and/or the building controller 70 (FIG.

5). It will be appreciated that the HVAC controller 90 may include features of the building controller 14 and/or features of the building controller 70. Similarly, the building controller 14 may include features of the building controller 70 and/or the HVAC controller 90. The building controller 70 may include features of the building controller 14 and/or the HVAC controller 90. As can be seen, the HVAC controller 90 includes the plurality of inputs 74 and the plurality of outputs 76. The HVAC controller 90 includes the plurality of HOA switches 78 and the plurality of indicator lights 82. As referenced with respect to FIG. 5, each of the HOA switches 78 are manually actuatable between a HAND (H) setting, an OFF (O) setting and an AUTO (A) setting.

Figure 7:
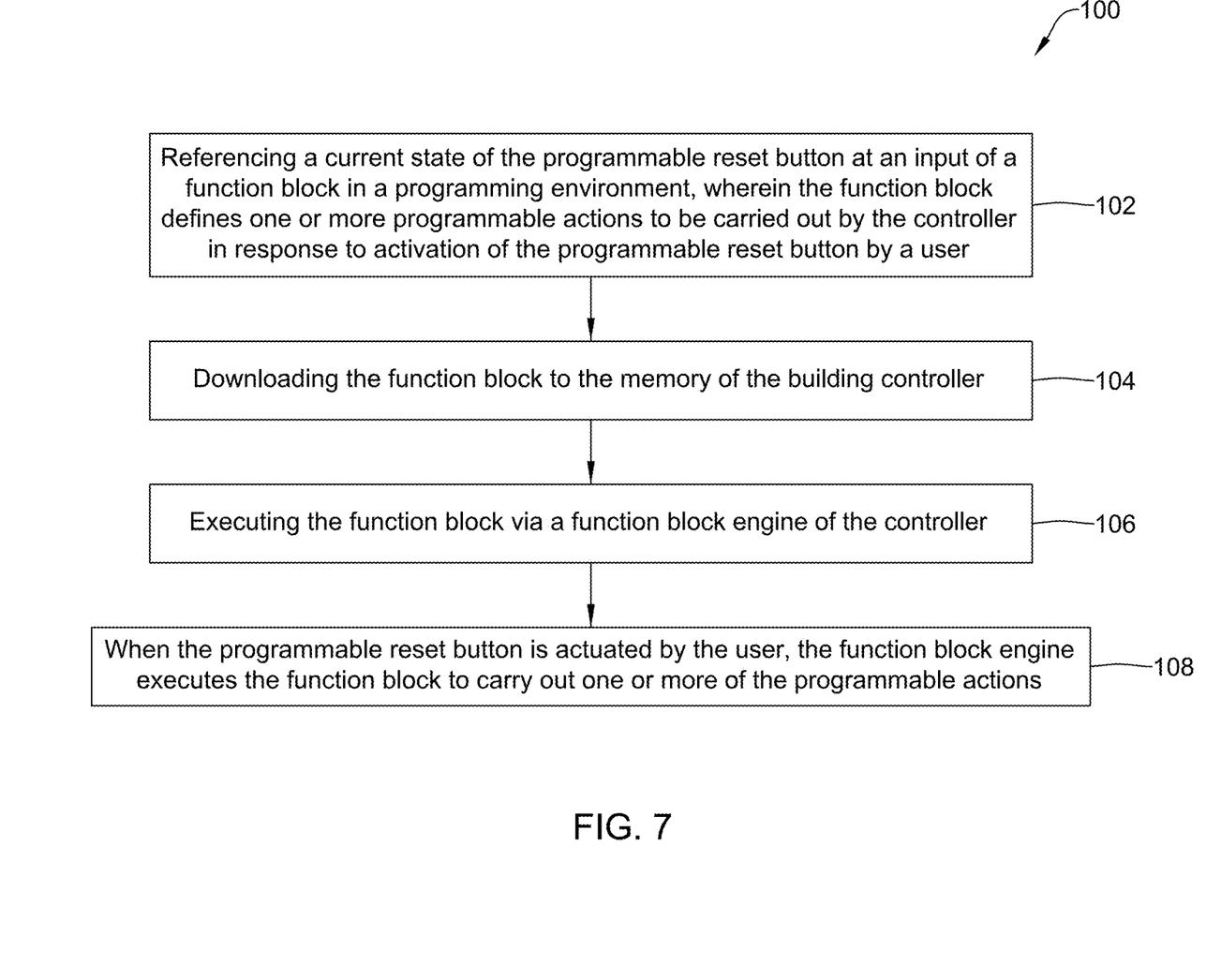
FIG. 7 is a flow diagram showing an illustrative method for configuring a building controller.

FIG. 7 is a flow diagram showing an illustrative method for configuring a building controller such as the building controller 70 (FIG. 5) that includes the plurality of inputs 74, the plurality of outputs 76, the programmable reset button 86, the memory 80 and the building controller 14. The method begins at block 102, with referencing a current state of the programmable reset button 86 at an input 74 of a function block in a programming environment, wherein the function block defines one or more programmable actions to be carried out by the building controller 14 in response to activation of the programmable reset button 86 by a user. As noted at block 104, the function block is downloaded to the memory of the building controller. In some instances, the function block may be downloaded to the memory 80 via an ETHERNET™ port such as the ETHERNET™ port 20 (FIG. 2) or the IP switch 84 (FIG. 5). As noted at block 106, the function block may be executed via a function block engine running on the building controller 14. When the programmable reset button 86 is actuated by the user, and as noted at block 108, the function block engine executes the function block to carry out one or more of the programmable actions.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A Heating, Ventilating and Air Conditioning (HVAC) controller for controlling operation of at least part of an HVAC system, the HVAC controller comprising:
    a housing;
    a plurality of inputs carried by the housing and accessible from outside of the housing;
    a plurality of outputs carried by the housing and accessible from outside of the housing;
    a plurality of manually-actuated HAND-OFF-AUTO (HOA) switches carried by the housing each having a HAND (H) position, an OFF (O) position and an AUTO (A) position, each of the plurality of HOA switches associated with a corresponding output of the plurality of outputs;
    a memory housed by the housing;
    a controller housed by the housing and operably coupled to the memory, the plurality of inputs, the plurality of outputs, and the plurality of HOA switches, the controller configured to:
        receive signals from the plurality of inputs;
        recognize a position of each of the plurality of HOA switches;
        provide control signals to the plurality of outputs, wherein the control signal provided to a first one of the plurality of outputs is based at least in part on the recognized position of the HOA switch that corresponds to the first one of the plurality of outputs in conjunction with a configuration setting stored in the memory that is also associated with the HOA switch that corresponds to the first one of the plurality of outputs; and
        wherein the control signal provided to the first one of the plurality of outputs is based at least in part on one or more of the received signals from the plurality of inputs when the HOA switch that corresponds to the first one of the plurality of outputs is in the AUTO (A) position.

2. The HVAC controller of claim 1, wherein the configuration setting is programmable.

3. The HVAC controller of claim 1, wherein the control signal provided to the first one of the plurality of outputs is not based on one or more of the received signals from the plurality of inputs when the HOA switch that corresponds to the first one of the plurality of outputs is in the HAND (H) position.

4. The HVAC controller of claim 3, wherein the control signal provided to the first one of the plurality of outputs is not based on one or more of the received signals from the plurality of inputs when the HOA switch that corresponds to the first one of the plurality of outputs is in the OFF (O) position.

5. The HVAC controller of claim 1, wherein the configuration setting associated with the HOA switch that corresponds to the first one of the plurality of outputs defines a delay period, wherein the control signal provided to the first one of the plurality of outputs is based on at least in part on the recognized position of the HOA switch that corresponds to the first one of the plurality of outputs only after the recognized position of the HOA switch that corresponds to the first one of the plurality of outputs remains in the same recognized position for at least the delay period.

6. The HVAC controller of claim 1, wherein the configuration setting stored in the memory is associated with the HOA switch that corresponds to the first one of the plurality of outputs and is also associated with the HOA switch that corresponds to a second one of the plurality of outputs, and wherein the control signal provided to the first one of the plurality of outputs is based at least in part on:
    the recognized position of the HOA switch that corresponds to the first one of the plurality of outputs;
    the recognized position of the HOA switch that corresponds to the second one of the plurality of outputs; and
    the configuration setting that is associated with the HOA switch that corresponds to the first one of the plurality of outputs and also associated with the HOA switch that corresponds to a second one of the plurality of outputs.

7. The HVAC controller of claim 1, wherein the configuration setting stored in the memory is associated with the HOA switch that corresponds to the first one of the plurality of outputs and is also associated with the HOA switch that corresponds to a second one of the plurality of outputs, and wherein the configuration setting causes the controller to not control the first one of the plurality of outputs in accordance with the HAND (H) position of the HOA switch that corresponds to the first one of the plurality of outputs when the HOA switch that corresponds to the second one of the plurality of outputs is already in the HAND (H) position.

8. The HVAC controller of claim 1, wherein the configuration setting stored in the memory is associated with the HOA switch that corresponds to the first one of the plurality of outputs and is also associated with the HOA switch that corresponds to a second one of the plurality of outputs, and wherein the configuration setting causes the controller to prevent both the first one of the plurality of outputs and the second one of the plurality of outputs to both be concurrently turned on, regardless of the recognized positions of the HOA switch that corresponds to the first one of the plurality of outputs and the HOA switch that corresponds to the second one of the plurality of outputs.

9. The HVAC controller of claim 1, further comprising a plurality of indicator lights, wherein each of the plurality of indicator lights is associated with one of the plurality of outputs.

10. A building controller for controlling operation of one or more building components in a building system, the building controller comprising:
   a housing;
   a plurality of inputs carried by the housing and accessible from outside of the housing;
   a plurality of outputs carried by the housing and accessible from outside of the housing;
   a plurality of manually-actuated HAND-OFF-AUTO (HOA) switches each having a HAND (H) position, an OFF (O) position and an AUTO (A) position, wherein each of the plurality of HOA switches is associated with but not directly coupled to a corresponding output of the plurality of outputs;
   a controller operatively coupled to the plurality of inputs, the plurality of outputs, and the plurality of HOA switches, the controller configured to recognize a position of each of the plurality of HOA switches, and to control one or more of the plurality of outputs in accordance with the recognized position of each of the plurality of HOA switches as well as a plurality of programmed configuration settings associated with the plurality of HOA switches; and
   wherein the controller controls one or more of the plurality of outputs based at least in part on one or more of the plurality of inputs when a corresponding HOA switch of the plurality of HOA switches is in the AUTO (A) position.

11. The building controller of claim 10, wherein the controller is further configured to enable a predetermined delay before changing one of the plurality of outputs in response to a user manually changing a position of a corresponding HOA switch of the plurality of HOA switches between OFF, HAND and/or AUTO positions.

12. The building controller of claim 10, further comprising a plurality of indicator lights, each of the plurality of indicator lights associated with one of the plurality of HOA switches and a corresponding one of the plurality of outputs, the controller further configured to actuate one or more of the plurality of indicator lights responsive to whether the controller has energized the corresponding output of the plurality of outputs.

13. The building controller of claim 12, wherein the controller is configured to communicate additional information by blinking one or more of the plurality of indicator lights in one or more predetermined blinking patterns.

14. The building controller of claim 10, further comprising a multi-port INTERNET PROTOCOL (IP) switch.

15. The building controller of claim 10, wherein the building system comprises a Heating, Ventilating and Air Conditioning (HVAC) system.

16. The HVAC controller of claim 10, wherein the controller does not control one or more of the plurality of outputs based at least in part on one or more of the plurality of inputs when a corresponding HOA switch of the plurality of HOA switches is in the HAND (H) position.

17. The HVAC controller of claim 10, wherein the controller does not control one or more of the plurality of outputs based at least in part on one or more of the plurality of inputs when a corresponding HOA switch of the plurality of HOA switches is in the OFF (O) position.

18. A building control system, comprising:
   a building controller comprising:
      a plurality of inputs;
      a plurality of outputs;
      a plurality of manually-actuated HAND OFF AUTO (HOA) switches each having a HAND (H) position, an OFF (O) position and an AUTO (A) position, and wherein each of the plurality of HOA switches is associated with but not directly coupled with a corresponding output of the plurality of outputs;
      a plurality of indicator lights, each of the plurality of indicator lights associated with one of the plurality of HOA switches and a corresponding one of the plurality of outputs; and
      a controller that is operably coupled to the plurality of inputs, the plurality of outputs, and the plurality of HOA switches
   a programming computing device configured to interact with a user to define a programmable function block wire sheet that defines one or more functions of the building controller, wherein the programmable function block wire sheet is configured to reference a position of one or more of the HOA switches of the building controller when defining a function of one or more of the plurality of outputs of the building controller;
   the controller of the building controller including a function block engine that is configured to execute code translated from the programmable function block wire sheet to control one or more of the plurality of outputs of the building controller.

19. The building control system of claim 18, wherein the function of a first one of the plurality of outputs includes providing a control signal to the first one of the plurality of outputs based at least in part on one or more signals received on one or more of the plurality of inputs when the HOA switch that corresponds to the first one of the plurality of outputs is in the AUTO (A) position.

20. The building control system of claim 19, wherein the function of the first one of the plurality of outputs includes providing a control signal to the first one of the plurality of outputs that is not based on one or more signals received on one or more of the plurality of inputs when the HOA switch that corresponds to the first one of the plurality of outputs is in the HAND (H) position and/or OFF (O) position.

* * * * *